Aug. 18, 1942.   J. W. OVERBEKE   2,293,167
HYDRAULIC CYLINDER
Filed Nov. 3, 1939   4 Sheets-Sheet 1
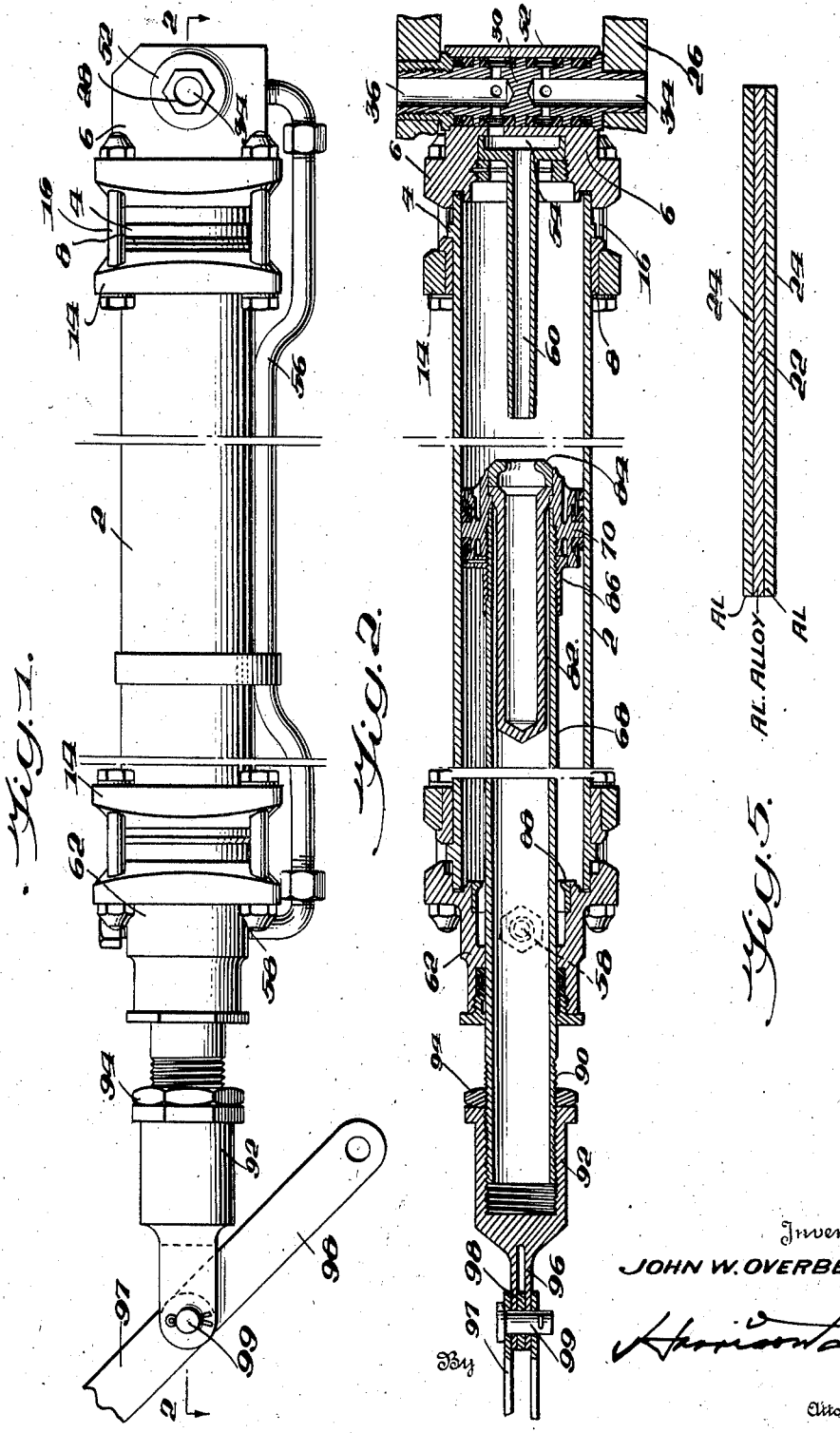
Inventor
JOHN W. OVERBEKE,
Attorney

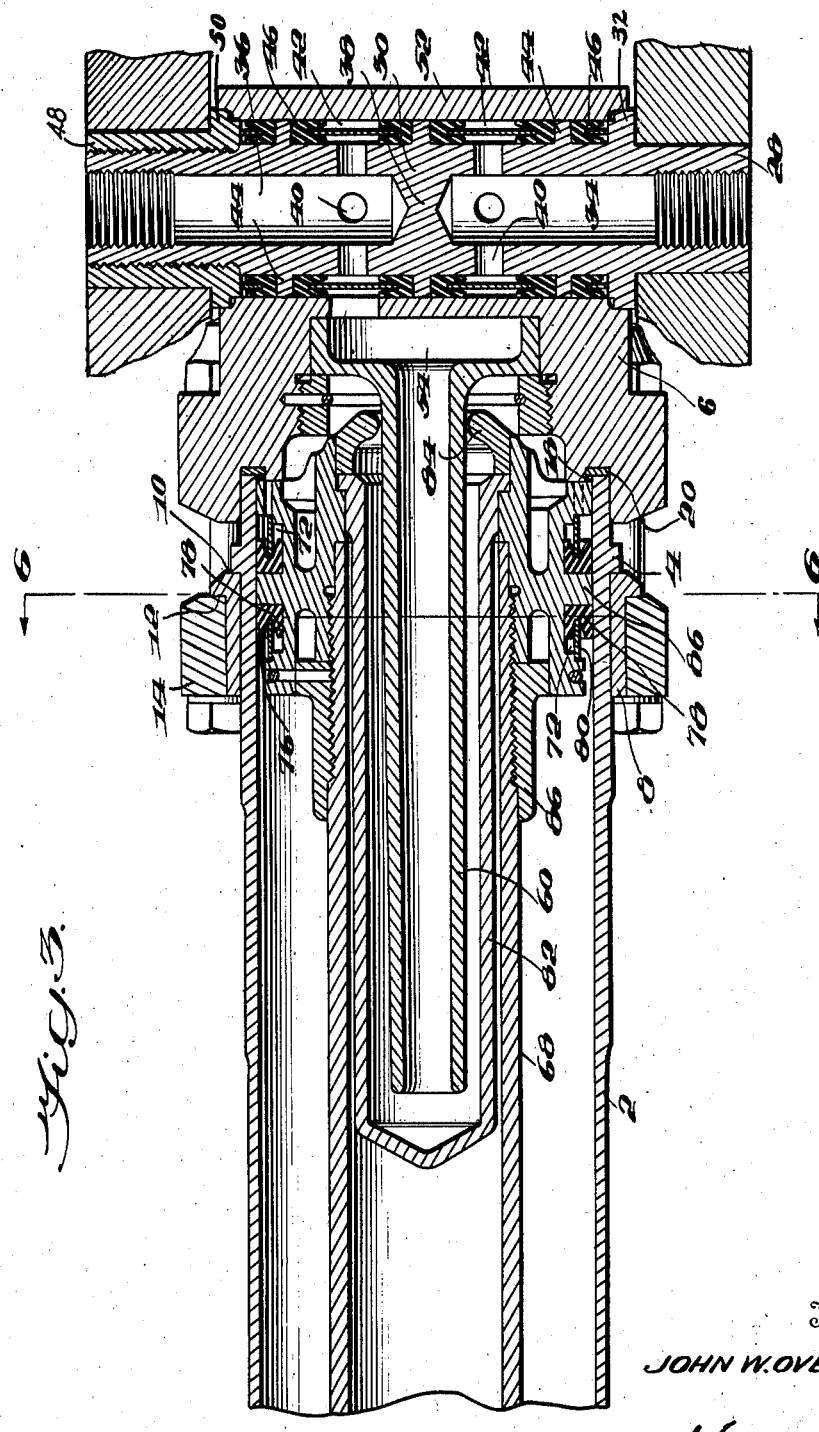

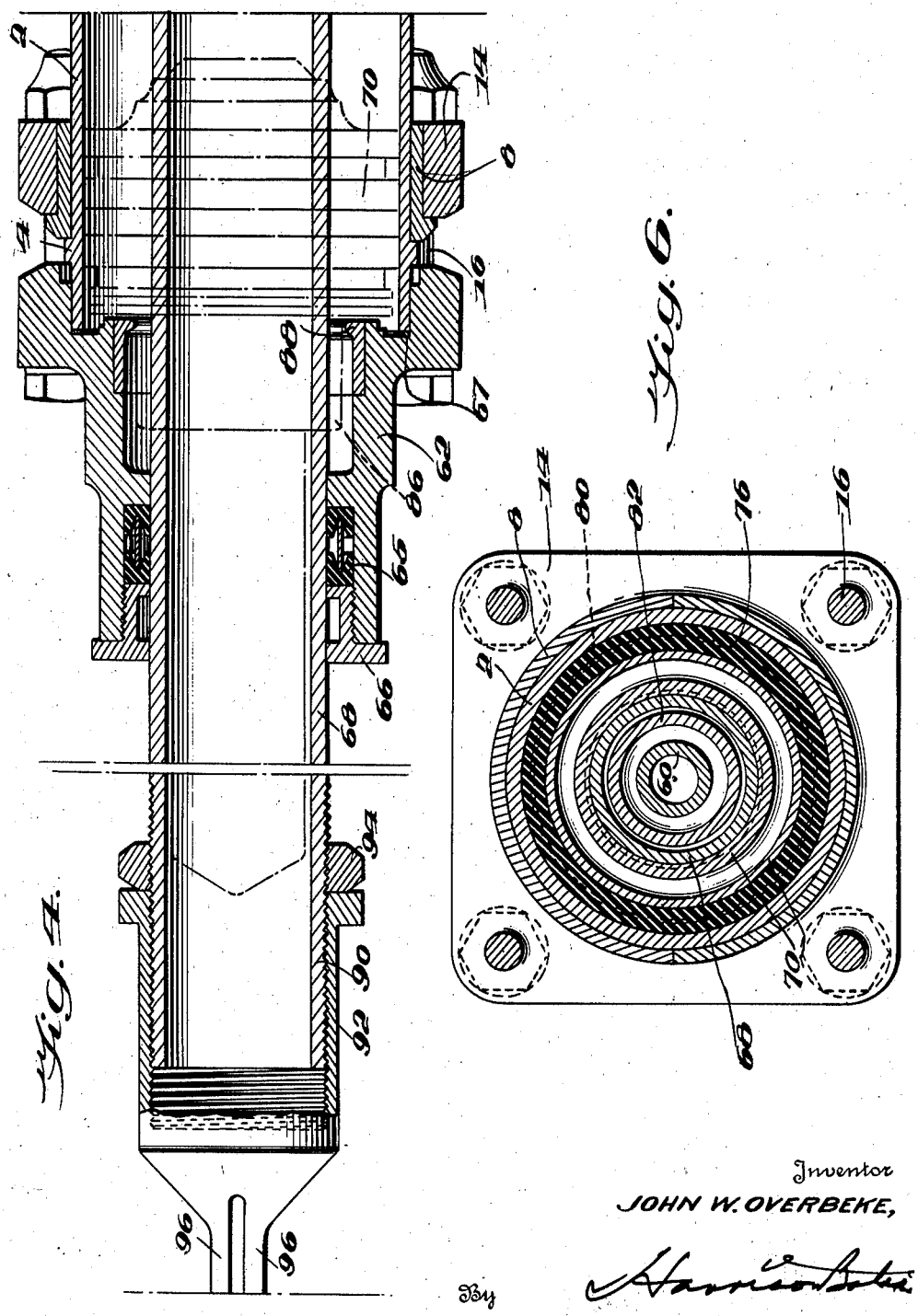

Aug. 18, 1942. J. W. OVERBEKE 2,293,167
HYDRAULIC CYLINDER
Filed Nov. 3, 1939 4 Sheets-Sheet 4
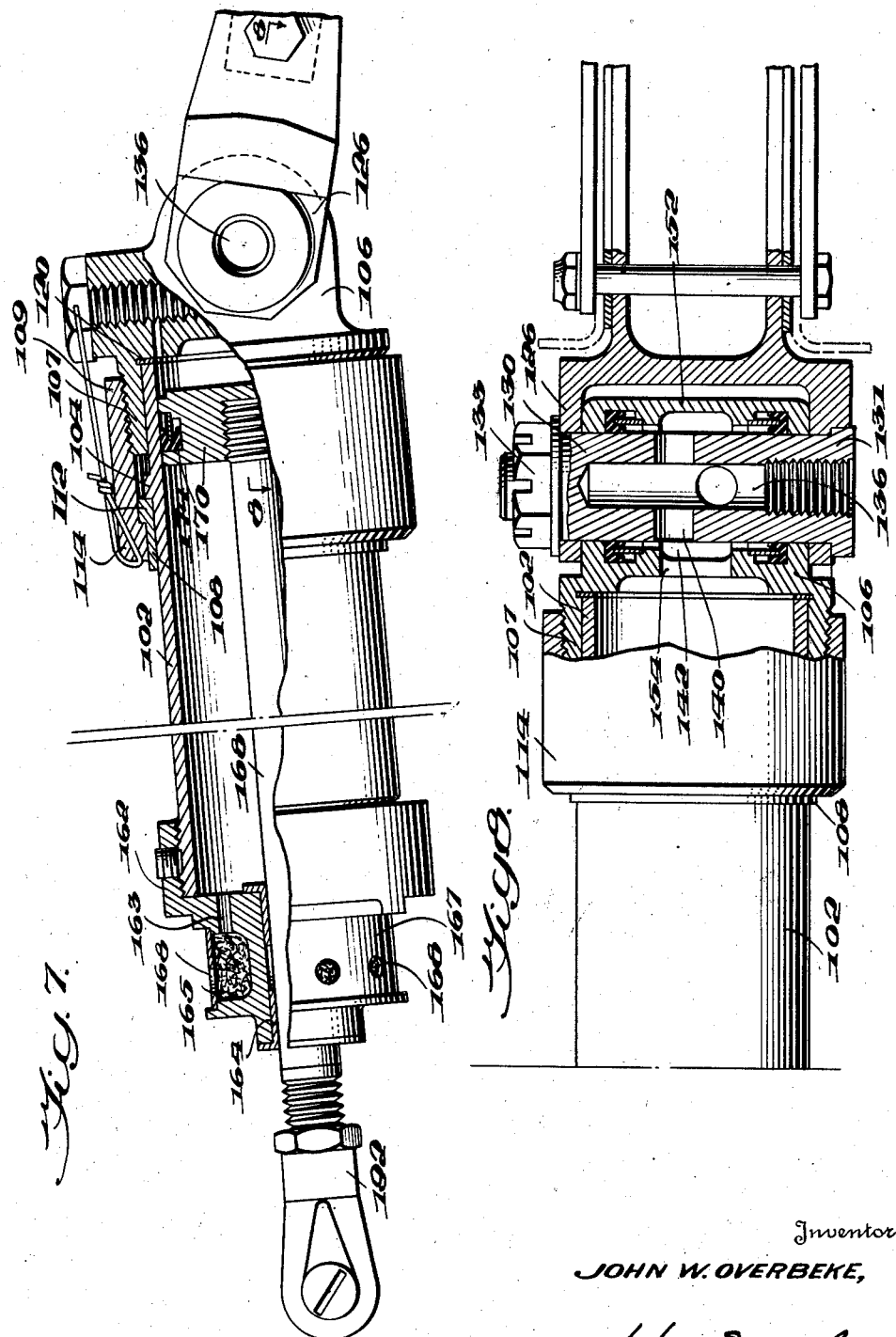
Inventor
JOHN W. OVERBEKE,
By
Attorney Patented Aug. 18, 1942

2,293,167

UNITED STATES PATENT OFFICE 2,293,167

HYDRAULIC CYLINDER

John W. Overbeke, Anneslie, Md., assignor to The Glenn L. Martin Company, Baltimore, Md.

Application November 3, 1939, Serial No. 302,709

2 Claims. (Cl. 121—38)

The invention relates to hydraulic cylinders.

Various problems arise in the construction and use of hydraulic cylinders. These cylinders are likely to leak at the joints, or around the piston. If the cylinder must be movable, as for example if it must be pivoted about one end thereof, there is a problem of furnishing pressure fluid to the cylinder for its operation. The rate of operation of the cylinder may also be of importance.

The primary object of the present invention is to provide hydraulic cylinder mechanism which overcomes the above and other disadvantages met with in the prior art.

The primary object of the invention is to provide a novel type of joint for securing the ends on a cylinder, which is liquid-tight and which is easily applied and removed, while still being able to withstand great pressures. Many hydraulic cylinders today are formed of a light metal to achieve a saving in weight. Such metals do not present adequate surfaces for the reception of threads, since the metals are likely to be relatively soft, and therefore do not hold a threaded joint against high pressures. The present invention provides means for securing the ends on cylinders which avoid the use of threads on the cylinder body and thus produce a strong joint capable of withstanding high pressures.

A further object of the invention is to provide, particularly in such a joint, a novel type of sealing member which is adapted to be deformed into tight engagement with the surfaces between which it is arranged without the likelihood that it will be squeezed out from between these surfaces where parts of the material may break off and interfere with the operation of the cylinder.

Still another object of the invention is to provide a novel mounting for a hydraulic cylinder which permits the cylinder to turn about an axis, and still feeds pressure fluid thereto without the use of flexible pipes or other similar elements which have been heretofore used. Particularly the invention involves a special pivot arrangement in which the fluid is fed in through a fixed pin about which the cylinder is mounted for turning movement.

Still another object of the invention is to provide a novel type of sealing ring for use in hydraulic pressure cylinders, which is easy to install on the piston and which gives a tight seal when in use, and has a long life.

A further object of the invention is to provide a novel mechanism for regulating the speed of operation of the hydraulic piston. In the operation of many types of devices it is desirable that the piston should move rapidly for a considerable part of its stroke, so as to actuate the mechanism quickly, while at the end of its stroke the piston should move quite slowly so as to avoid shocks. For example, in the movement of a landing gear on an aircraft to retracted position the gear should be retracted most of the way quite quickly, but the last part of its motion should be slow so as to avoid shocks on the parts on which it is mounted. The present invention includes means for automatically reducing the speed of operation towards the ends of the stroke. In particular it provides cooperating means in the cylinder and piston for throttling the flow of fluid into and out of the cylinder towards the end of the stroke, while giving a free flow at other times.

Some cylinders are of the one-way type, that is the type in which fluid is admitted on one side only of the piston, the other side being exposed to the air. Dust in the air which is sucked in when the piston moves in one direction is likely to collect on the cylinder walls, and may pass by the piston and become mixed with the operating fluid, thus contaminating it and scoring the piston and cylinder as well as other parts of the system. The present invention is designed to provide means for removing such dust from the air before it enters the cylinder, so as to avoid any possibility of contamination and damage to the apparatus in this manner.

Further objects and advantages of the invention will appear more fully from the description, particularly when taken in conjunction with the accompanying drawings which form a part thereof.

In the drawings:

Fig. 1 shows in side elevation one form of cylinder embodying my invention;

Fig. 2 is a cross-section on the line 2—2 of Fig. 1;

Fig. 3 is an enlargement of the right-hand portion of Fig. 2 with the piston in retracted position;

Fig. 4 is a similar view of the left-hand end of Fig. 2, with the piston in retracted position, and showing in broken lines the piston in extended position;

Fig. 5 is a detail cross-section through the sealing member;

Fig. 6 is a cross-section on the line 6—6 of Fig. 3;

Fig. 7 shows in side elevation with parts broken away a modified form of the invention, embodying a one-way piston;

Fig. 8 is a cross-section on the line 8—8 of Fig. 7.

In the form shown in Figs. 1 to 6, the invention includes a cylinder such as 2 formed of a light alloy, such as the well known aluminum alloys. Adjacent each end of this piston but spaced slightly inwardly therefrom there is formed on the outside thereof an annular shoulder 4, or other form of stop. Otherwise the cylinder is of simple cylindrical form.

Secured on the right-hand or inner end of the cylinder is a closure block or cylinder end member 6. The block 6 is not threaded on the cylinder end, since this would involve the provision of threads in the light metal, which threads would be likely to be stripped by the pressure because of the comparative softness of the metal of the cylinder. Instead, there is provided a split ring 8 adapted to fit on the outside of the cylinder, and having a surface 10 capable of resting against the inner face of shoulder 4 and an opposed surface 12 parallel to surface 10. An annular ring 14 is adapted to fit on the outside of ring 8, and to rest against the shoulder 12. Bolts 16 pass through lugs on ring 14 and block 6 to connect the block 6 to the cylinder end.

In assembling this mechanism, the ring 14 is first slipped over the end of the cylinder, well beyond the shoulder 4. The two portions of ring 8 are then assembled in the position shown, and ring 14 is slid back to the position shown in Fig. 3. The block 6 is then applied on the end of the cylinder, and the bolts are applied and tightened so as to hold the block 6 in position.

The block 6 is provided with a groove 18 into which the end of the cylinder 2 can fit. Within this groove is arranged a sealing ring 20, which is thus pressed between the bottom of the groove and the outer edge of the cylinder. This ring is shown in detail in Fig. 5. I have found that by utilizing a metallic sealing member composed of a relatively hard metal core coated on both faces with a softer metal it is possible to obtain a fluid tight seal which is strong enough to retain its constitution in spite of the pressure to which it is subjected. Preferably this seal is composed of 24 ST Alclad, which is a core such as 22 of an aluminum alloy which is relatively hard, coated on both faces with a layer 24 of aluminum. The aluminum layers 24 are relatively soft, and thus can be deformed to fit any irregularities in the surface between which they are pressed. The core 22 at the same time prevents the squeezing of the softer aluminum out from between the surfaces, since it in effect anchors the aluminum. Thus there is no danger that the aluminum will be squeezed into the cylinder where it may break off in the form of small particles and interfere with the operation thereof.

The cylinder is intended to be mounted in a suitable frame having two arms 26 provided with aligned openings therein. Into one of these openings fits a reduced end 28 of a sleeve or trunnion member 30. This member is provided with a large flange 32 adjacent its end 28 which rests against the inner face of one of the members 26. The sleeve is also provided at each end with inlet passages 34 and 36 respectively, these being separated by a central wall portion 38. Each of the inlet passages is connected by transverse passages 40 to an annular space 42, the spaces 42 being formed by three small projecting annular flanges 44 on the sleeve 30. The spaces 42 are sealed by suitable sealing members 46.

Threaded on the other end of the core or sleeve 30 is a member 48 adapted to fit in the hole in the other support 26. This member has at its inner end a large flange 50. The block 6 has an extending cylindrical portion 52 through which the pin 30 extends, this cylindrical portion being restrained against lateral movement by the flanged portions 32 and 50, and resting also on the annular flanges 44 both to provide a bearing for the cylindrical portion 52 and to close off the spaces 42. The cylinder is thus mounted for turning movement about its right-hand end on the axis of the member 30.

The block 6 is also provided with an inlet opening 54 communicating with one of the spaces 42. Fluid from the opening 54 enters into an elongated tube 60 of reduced cross-section which is mounted in the end block 6. The other space 42 communicates with a pipe 56 which is rigid with the cylindrical portion 52, and which enters as at 58 at the other end of the cylinder 2 on the opposite side of the piston.

The outer end of the cylinder, through which the piston rod extends is secured thereto in a generally similar fashion. The cylinder end block 62 is connected by bolts 16 to an annular ring 14 mounted on a split annular member 8 arranged behind the shoulder 4. The cylinder packing 64 is similar to packing 20. The rod packing 65 is held in position by a suitable nut 66.

The piston rod is in the form of a hollow tube 68. On one end is secured the piston 70. The piston is provided with two ring grooves 72 in which are mounted a novel type of packing. Each packing comprises an annular ring 74 preferably of rubber or some similar elastic material. The ring has two annular projections 76 and 78 forming a groove therebetween. A metal ring 80 fits into this groove and at its other side rests on the end surface of the piston groove 72, so as to hold the ring 74 in place. The outer annular projection 76 is resiliently urged into contact with the wall of the cylinder, and thus keeps a constant pressure thereagainst to seal the piston as it slides in the cylinder. The projections on the two rings are oppositely directed so as to seal the piston upon movement in both directions.

Extending into the hollow piston rod from the right-hand or inner end is a tube 82, closed at its left-hand end and at its right-hand end provided with an inwardly turned portion 84 providing a reduced outlet. The opening in member 84 is slightly larger than the outside diameter of the projecting fluid inlet 60. As long as the piston is moving freely in the cylinder, that is, from the left towards the right, until the portion 84 approaches very closely to the end of tube 60, fluid may flow freely out through tube 60. When, however, the tube 60 enters and extends through the opening in member 84 the flow of fluid is greatly retarded because it must flow through the small remaining portion of opening 84 from the outside of tube 60 to the inside thereof, through the tube 82. Therefore the motion will be greatly retarded towards the end of the movement of the piston in the cylinder.

A similar braking effect is obtained as the piston moves towards the left. The piston carries at its left-hand side a flange 86, which as it approaches the left-hand end of its movement passes into the reduced opening formed by the inwardly projecting ring 88. It is evident that the fluid displaced by the piston and escaping through outlet 58 must then pass through the narrow opening between flange 86 and projection 88, which will of course retard the rate of escape of fluid and thus the motion of the piston.

The mechanism is so arranged that the connection to the piston rod may be varied. For this purpose the end of the piston rod is threaded as at 90, and there is fitted thereon an internally threaded sleeve 92 which may be held in any given position by a lock nut 94. The end of the sleeve is reduced to form two extending plates 96. To the outsides of these plates are connected links 97 which in turn are connected to the device which is to be moved. Between the two plates extends a link 98 which is intended for manual operation in case the cylinder should be inoperative for any reason. Links 97 and 98 are both connected to the plates by a single pin 99.

It will be evident that as fluid is supplied to one or the other of inlet openings 34, 36 the piston will be moved in one direction or the other, the fluid exhausting through the other of the openings.

The form of the invention shown in Figs. 7 and 8 embodies many of the features of that described above, but relates to a one-way cylinder in which fluid is admitted on one side only of the piston.

The cylinder 102 is provided on its right-hand end with a shoulder 104. On the inside of this shoulder is arranged a ring 108, preferably a split ring, having a shoulder 112. An annular ring 114 of a hard metal such as steel surrounds the ring 108 and is held against outward movement by shoulders 112 and 104. The cylinder head end 106 is provided with a sleeve projection 107 adapted to fit over the end of the cylinder wall, and extending into the projecting portion 109 of ring 114, these two overlapping parts being threadedly engaged to connect them together. Between the cylinder end 106 and the end wall of the cylinder is arranged a sealing member 120 similar to that shown in Fig. 5. The cylinder head is thus secured to the cylinder wall without the use of any threads on the cylinder itself.

The cylinder is mounted to turn about its right-hand end in a frame having portions 126 provided with opposed openings therein. Through these openings passes a pin or sleeve 130, having at one end a flange 131 adapted to engage the outside of one of portions 126, and held in position at its other end by a nut 133 engaging the other member 126. The sleeve is provided with a bore 136 which communicates through radial apertures 140 with a space 142 formed in a cylindrical projection 152 of the cylinder end portion 106 through which the core 130 extends. A passage 154 connects the chamber 142 to the interior of the cylinder 102.

The piston 170 is similar to that shown in Figs. 1 to 6, except that only a single sealing ring 174, identical with the right-hand sealing ring of Figs. 1 to 6, is provided.

The other end of the cylinder is not subjected to hydraulic forces and therefore there is no necessity for the use of a special connection. The cylinder end member 162 is merely threaded on the end of the cylinder. The piston rod 168 extends through a suitable sleeve 164 therein, and is provided with an adjustable end 192.

It has been found that in a cylinder of this type there is danger that the air which is sucked in when the piston moves to the right will bring in dust and dirt which will slip by the piston and thus contaminate the fluid. This results in scoring of the different parts of the system and in other damage. To avoid this danger, the cylinder end 162 is provided with a series of holes or passages 163 which lead into an annular groove 165 filled with a suitable filtering material such as soft metal wool which may be coated with an oily or greasy liquid to catch dust particles. The groove 165 is closed by a sheet metal sleeve 167 provided with a plurality of air holes 168 therein to permit the air to enter and leave the filter.

Obviously with the above mechanism the admission of fluid under pressure into opening 136 will move the piston to the left. The device is of course used with some mechanism which either by gravity or by spring devices normally urges the piston to the right. Thus when the pressure is released, the piston will be moved to the right under the action of the opposing force.

While I have described herein some embodiments of my invention I wish it to be understood that I do not intend to limit myself thereby except within the scope of the appended claims.

I claim:

1. In hydraulic cylinder mechanism, a frame having opposed openings therein, a sleeve member mounted in said openings, said sleeve member having passages opening into the ends thereof through said openings, a hydraulic cylinder having a head portion provided with a cylindrical part surrounding said sleeve and mounted for turning movement thereon between said frame members, said sleeve being provided with three spaced annular flanges forming with said cylindrical portion a plurality of annular chambers, passages connecting said openings in said sleeve to said annular chambers, a passage in said cylinder head portion connecting one of said annular chambers to the interior of the cylinder, and means mounted on said cylinder connecting the other annular chamber to the other end of the cylinder.

2. In hydraulic cylinder mechanism, a frame having opposed openings therein, a sleeve member mounted in said openings, said sleeve member having passages opening into the ends thereof through said openings, a hydraulic cylinder having a head portion provided with a cylindrical part surrounding said sleeve and mounted for turning movement thereon between said frame members, said sleeve having three small annular flanges thereon engaging the inner face of said cylindrical portion and forming therewith a plurality of annular chambers, passages connecting said openings in said sleeve to respective ones of said annular chambers, a passage in said cylinder head portion connecting one of said annular chambers to the interior of the cylinder, means mounted on said cylinder connecting the other annular chamber to the other end of the cylinder, said sleeve being formed also with a large flange adjacent one end between the corresponding end of the cylindrical part of the head portion and the frame adjacent one opening, and a member threaded externally to the other end of said sleeve within the adjacent frame opening, said member having a large flange adjacent its inner end arranged between the corresponding end of the cylindrical part of the head portion and the frame.

JOHN W. OVERBEKE.